US006077917A

United States Patent [19]

Tachika et al.

[11] Patent Number: 6,077,917

[45] **Date of Patent: *Jun. 20, 2000**

[54] COATING RESIN COMPOSITION

[75] Inventors: Hiroshi Tachika; Masami Oka; Kuniyuki Doi, all of Ohtsu, Japan

[73] Assignee: Toyo Boseki Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,011

[22] Filed: Oct. 7, 1997

Related U.S. Application Data

[63] Continuation of application No. 08/667,176, Jun. 20, 1996, abandoned.

[30] Foreign Application Priority Data

Jul. 5, 1995 [JP] Japan .................................... 7-169828

[51] Int. Cl.$^{7}$ .................................................. C09D 167/02

[52] U.S. Cl. .......................... 525/438; 525/440; 525/443; 525/448

[58] Field of Search .................................... 525/438, 443, 525/440, 448

[56] References Cited

U.S. PATENT DOCUMENTS

| | | | |
|---|---|---|---|
| 4,968,775 | 11/1990 | Toman et al. . | |
| 5,288,559 | 2/1994 | Oka | 525/443 |
| 5,380,816 | 1/1995 | Sullivan . | |
| 5,563,223 | 10/1996 | Tachika | 525/438 |

*Primary Examiner*—Patricia A. Short

*Attorney, Agent, or Firm*—Kenyon & Kenyon

[57] ABSTRACT

This invention offers a coating resin composition which exhibits excellent drawing processability, processability and hardness and forms a coat having good processability, hardness, scuff resistance, impact resistance, stain resistance and blocking resistance even in clear or low pigment concentration. Disclosed herein is a coating resin composition containing a polyester resin (A) which has a glass transition point of 10–80° C., reduced viscosity of not less than 0.2 dl/g and specific gravitity of 1.21–1.30 and mainly comprises aromatic dicarboxylic acid including terephthalic acid, 2-methyl-1,3-propanediol and/or 1,3-propanediol and alkylene glycol with 5–10 carbon atoms and/or alicyclic glycol and a hardener (B) which is reactive with said polyester resin (A).

12 Claims, No Drawings

COATING RESIN COMPOSITION

This application is a continuation of application Ser. No. 08/667,176, filed on Jun. 20, 1996, now abandoned.

FIELD OF THE INVENTION

The present invention relates to a coating resin composition which has excellent processability and hardness, gives a coat having an appearance with excellent gloss and vividness, has a prominent drawing processability and exhibits good hardness, processability and scuff resistance in clear or low pigment concentrations.

BACKGROUND OF THE INVENTION

With regard to the paint used as a resin for precoated metal sheets, there are many paints including copolymerized polyester resin, alkyd resin, vinyl resin and silicon resin paints and they are used in a form of a solvent system, aqueous dispersion system or powder paint. However, in any of those cases, there is no product which satisfies all of the requested properties and it is unavoidable that, when one property is given the top priority, other properties will become unsatisfactory whereby it is the real fact that there is a limit upon actual use.

Moreover, there has been a demand of drawing processability in recent years not only for two-piece food/beverage cans but also for precoated metal sheets because of giving high added-value. In the meanwhile, clears, color clears and metallic paints with high ornamental value as well as deep color paints with low pigment concentrations have been investigated. However, any of them does not have sufficient property at present whereby various problems have been left unsolved or their practical utilization has been delayed.

For example, in the Japanese Kokai Patents Sho-57/57,746 and Sho-63/108,081, investigations were made for giving both hardness and processability but sufficient effects are not achieved in any of them. In the Japanese Kokoku Patent Sho-62/21,830, coating resin compositions mainly comprising terephthalic acid and alkylene glycol were investigated but their gloss retention (GR) is poor upon drawing processing and, therefore, they have not been actually used. In turn, the product showing a relatively good processability has insufficient hardness and, especially in the case of clear or low-pigment products, hardness, scuff resistance and stain resistance are considerably insufficient. Further, alkali resistance, weather resistance and gasket resistance are insufficient too.

Another coating resin composition mainly comprising terephthalic acid and alkylene glycol has been also known from the Japanese Kokoku Patent Sho-61/34,754. Again, its drawing processability is insufficient and, in the case of clear or low-pigment products, hardness, scuff resistance and stain resistance are considerably insufficient.

In the Japanese Kokai Patent Hei-07/18,169, a coating resin composition mainly comprising isophthalic acid, orthophthalic acid and long-chain glycol is disclosed and, although the resulting product exhibits good weather resistance, alkali resistance and processability, its drawing processability is insufficient and its hardness, stain resistance and scuff resistance are poor.

In said Japanese Kokai Patent Hei-07/18,169, a coating resin composition mainly comprising isophthalic acid, orthophthalic acid and alkylene glycol is investigated as well and, although the reuslting product exhibits good processability, weather resistance and alkali resistance, its hardness, blocking resistance pressure-mark resistance and stain resistance are considerably insufficient. Further, in spite of its low glass transition temperature (Tg), its drawing processability is insufficient.

In the Japanese Kokai Patent Sho-59/91,118, polyester in which 2-methyl-1,3-propanediol is used is known. Its object is to reduce the cost and to improve the workability upon polymerization by the use of 2-methyl-1,3-propanediol in place of neopentyl glycol and the product is a polyester having a lower molecular weight wherein a large amount of tri- or higher functional polyols are jointly used. Therefore, large amount of aliphatic dicarboxylic acid is copolymerized for achieving a processability but it does not give a sufficient result but processability, stain resistance, weather resistance, etc. are poor whereby the product is entirely unsuitable for coating resins.

In the polyester resins for precoated metal sheets, drawing processability is insufficient and there is a problem of reduction of gloss in the processed area even in the case of polyesters of low Tg having a good processability. Thus, if one wants to prepare clear or low-pigment concentrations having good hardness, it is usually necessary to make Tg not lower than 40° C. whereby the coat becomes considerably hard and good processability and impact resistance are not achieved. On the other hand, if one wants to achieve good processability and impact resistance, hardness will be reduced whereby good scuff resistance is not afforded and, in addition, problems such as blocking and pressure mark are resulted.

SUMMARY OF THE INVENTION

Under such circumstances, the present inventors have carried out intensive studies on coating resin which exhibits excellent drawing processability, shows good hardness, scuff resistance, blocking resistance, gasket resistance, pressure-mark resistance, processability and impact resistance even in clear or low-pigment concentrations and has good appearance, gloss and stain resistance of the coat and have found that the polyester resin having a glass transition point of 10–80° C. and a reduced viscosity of not less than 0.2 dl/g in which acid components are mainly composed of aromatic dicarboxylic acids including terephthalic acid while glycol components are composed of 25–100 molar % of 2-methyl-1,3-propanediol and/or 1,3-propanediol and 0–75 molar % of alkylene glycol having five to ten carbon atoms and/or alicyclic glycol where the total amount of said glycols is not less than 50 molar % exhibits wonderful coat properties having an excellent drawing processability, showing good hardness, gasket resistance, pressure-mark resistance, processability and impact resistance even in clear low-pigment concentrations and further having gloss, vividness and stain resistance whereby the present invention has been achieved.

Thus, the present invention relates to a coating resin composition characterized in that, in said composition, polyester resin (A) of a glass transition point of 10–80° C., a reduced viscosity of not less than 0.2 dl/g and a specific gravity of 1.21–1.30 having acid components which comprise 10–70 molar % of terephthalic acid where the total amount of terephthalic acid and other aromatic dicarboxylic acids is 80–100 molar % and the amount of other dicarboxylic acids is 0–20 molar % and further having glycol components which comprise 25–100 molar % of 2-methyl-1,3-propanediol and/or 1,3-propanediol and 0–75 molar % of alkylene glycol having five to ten carbon atoms and/or alicyclic glycols where the total amount of said glycols is not less than 50 molar % is compounded with a hardener (B) which is able to react with said polyester resin (A) in such a ratio that (A)/(B) is from 95/5 to 60/40 by weight.

DETAILED DESCRIPTION OF THE INVENTION

In the acid components which are copolymerized with the polyester resin (A) of the present invention, the amount of terephthalic acid is 10–70 molar % or, preferably, 20–60 molar % and the total amount of terephthalic acid and other aromatic dicarboxylic acids is 80–100 molar % or, preferably, 90–100 molar % and that amount of other dicarboxylic acids is 0–20 molar %. When the amount of terephthalic acid is more than 70 molar %, good solubility in solvents is not achieved while, when it is less than 10 molar %, processability and hardness are not well-balanced. When the total amount of aromatic dicarboxylic acids is less than 80 molar %, it is not possible to afford good hardness, stain resistance, blocking resistance, pressure-mark resistance, alkali resistance and weather resistance.

Examples of the aromatic dicarboxylic acid which are other than terephthalic acid and are copolymerizable with the polyester resin (A) of the present invention are isophthalic acid, orthophthalic acid and 2,6-naphthalenedicarboxylic acid. Among those, the joint use of terephthalic acid with isophthalic acid is preferred especially in terms of well-balanced drawing processability, processability, impact resistance and hardness.

Examples of the other carboxylic acids which are copolymerizable with the polyester resin (A) of the present invention are aliphatic dicarboxylic acids such as succinic acid, glutaric acid, adipic acid, sebacic acid, dodecanedicarboxylic acid and azelaic acid; and alicyclic dicarboxylic acids such as 1,2-cyclohexanedicarboxylic acid, 1,3-cyclohexanedicarboxylic acid and 1,4-cyclohexanedicarboxylic acid and the use of alicyclic dicarboxylic acids is preferred. Polycarboxylic acids such as trimellitic acid anhydride and pyromellitic acid anhydride may be used therewith provided that they do not affect the merit of the invention.

The glycol components which are copolymerizable with the polyester resin (A) of the present invention comprise 25–100 molar %, preferably 30–90 molar % or, more preferably, 50–90 molar % of 2-methyl-1,3-propanediol and/or 1,3-propanediol and 0–75 molar %, preferably 10–50 molar %, of alkylene glycol having 5–10 carbon atoms and/or alicyclic glycol where the total amount of said glycols is not more than 50 molar %.

When the amount of 2-methyl-1,3-propanediol and/or 1,3-propanediol is less than 25 molar %, good drawing processability is not resulted and, in the case of clear or hyperchromic state, hardness, stain resistance, blocking resistance and pressure-mark resistance are insufficient. Good result is not obtained when glycol other than 2-methyl-1,3-propanediol and 1,3-propanediol is used as a hardening component having three or less carbon atoms in a main chain. For example, if ethylene glycol is used, good alkali resistance and weather resistance are not achieved, vanish stability is no good and deterioration in processability with a lapse of time is resulted. When neopentyl glycol is used, all of drawing processability, processability, hardness and stain resistance become insufficient. When 1,3-propanediol is used, joint use with alkylene glycol having 5–10 carbon atoms in which the carbon numbers at the main chain are 5 or more and there is alkyl group on a side chain such as 3-methyl-1,5-pentanediol is preferred particularly in terms of vanish stability and deterioration in processability with a lapse of time. In the polyester resin (A) of the present invention, it is preferred to copolymerize with alkylene glycol having 5–10 carbons and/or alicyclic glycol. As a result of such a copolymerization, a plasticity can be resulted and both processability and impact resistance can be improved. Especially when polyester having high glass transition point is required, it is recommended to use the alicyclic glycol in terms of processability and impact resistance.

Specific examples of the alkylene glycol having 5–10 carbon atoms used in the present invention are 1,5-pentanediol, 1,6-hexanediol, 3-methyl-1,5-pentanediol, 2-methyl-1,5-pentanediol, 1,9-nonanediol, 1,10-decanediol, 1,4-cyclohexanedimethanol, 1,3-cyclohexanedimethanol and 1,2-cyclohexanedimethanol. Particularly preferred examples in terms of physical properties of the applied coat are 1,6-hexanediol and 1,5-pentanediol.

Specific examples of the alicyclic glycol used in the present invention are 1,4-cyclohexandimethanol, 1,3-cyclohexanedimethanol, 1,2-cyclohexanedimethanol and hydrogenated bisphenol A. Particularly preferred one in terms of physical properties of the applied coat is 1,4-cyclohexanedimethanol.

Incidentally, multivalent polyols such as trimethylolethane, trimethylolpropane, glycrol and pentaerythritol may be used together therewith provided that they do not deteriorate the merit of the invention.

Further, dicarboxylic acid or glycol containing sulfonic acid metal sulfonates such as metal salt of 5-sulfoisophthalic acid, 4-sulfonaphthalene-2,7-dicarboxylic acid and 5-(4-sulfo-phenoxy)isophthalic acid or metal salt of 2-sulfo-1,4-butanediol and 2,5-dimethyl-3-sulfo-2,5-hexanediol may be used in an amount of not more than 5 molar % of the total acid or glycol components.

It is preferable that the acid value of the polyester resin (A) used in the present invention is 20–350 equivalents/$10^6$ g or, more preferably, 50–250 equivalents/$10^6$ g in terms of hardening ability and physical properties of the coat. As a result of such an acid value, hardening ability is improved and hardness, scuff resistance and stain resistance are further improved. It is not desirable that the acid value is more than 350 equivalents/$10^6$ g because it results in a reduction of processability.

A preferred method for giving the acid value to the polyester resin is that, after the polyester resin is polymerized, trimellitic acid anhydride, phthalic acid anhydride, pyromellitic acid anhydride, succinic acid anhydride, 1,8-naphthalic acid anhydride, 1,2-cyclohexanedicarboxylic acid anhydride, etc. are subjected to an after-addition at ordinary pressure to give the acid value.

The polyester resin (A) used in the present invention has a glass transition point of 10–80° C. or, preferably, 15–60° C. When the glass transition point is lower than 10° C., it is not possible to give sufficient hardness, scuff resistance, stain resistance and drawing processability while, when it is higher than 80° C., processability and impact resistance are reduced.

In the polyester resin (A) used in the present invention, the reduced viscosity is not less than 0.2 dl/g or, preferably, not less than 0.3 dl/g or, more preferably, not less than 0.4 dl/g. When the reduced viscosity is less than 0.2 dl/g, it is not possible to give sufficient processability, drawing processability, hardness and impact resistance.

In the polyester resin (A) used in the present invention, the specific gravity is 1.21–1.30 or, preferably, 1.22–1.28.

When the specific gravity is less than 1.21, a good balance between good hardness and drawing processability as well as processability is not resulted and, in addition, stain resistance is poor too. When the specific gravity is more than 1.30, it is not possible to afford a good solubility in solvents.

In the polyester resin (A) used in the present invention, the preferred number-average molecular weight is not less than 3,000 or, more preferably, not less than 8,000. When it is less than 3,000, processability, hardness and impact resistance are reduced. With regard to a hydroxyl value, it is preferably 30–500 equivalents/$10^6$ g or, more preferably, 30–250 equivalents/$10^6$ g. When the hydroxyl value is more than 500 equivalents/$10^6$ g, then the higher said value, the lower the processability and impact resistance. When the hydroxyl value is less than 30 equivalents/$10^6$ g, the reaction with a hardener is poor whereby hardness and stain resistance are reduced.

The coating resin composition of the present invention is used by compounding the polyester resin (A) with a hardener (B) which is reactive with (A). In that case, the compounding ratio of the polyester resin (A) to the hardener (B) in terms of (A)/(B) by weight is from 95/5 to 60/40. Preferably, the ratio of (A)/(B) is from 90/10 to 70/30. When the amount of (A) in terms of said ratio is more than 95/5, hardness of the coat, stain resistance, blocking resistance and pressure-mark resistance are lowered while, when it is less than 60/40, processability and impact resistance are lower and that is not preferred.

Examples of the hardener (B) which is reactive with the polyester resin (A) are alkyl-etherized aminoformaldehyde resins, epoxy resins and isocyanate compounds.

Alkyl-etherized aminoformaldehyde resin is a condensation product of formaldehyde or paraformaldehyde (which is previously alkyletherized with alcohol having 1 to 4 carbon atom(s) such as methanol, ethanol, n-propanol, isopropanol and n-butanol) with urea, N,N-ethyleneurea, dicyandiamide, aminotriazine, etc. and is, for example, methoxylated methylol-N,N-ethyleneurea, methoxylated methyloldicyandiamide, methoxylated methylolbenzoguanamine, butoxylated methylolbenzoguanamine, methoxylated methylolmelamine, butoxylated methylolmelamine, mixedly methoxylated/butoxylated methylolmelamine and butoxylated methylolbenzoguanamine. In terms of processability and stain resistance, it is particularly preferred to use methoxylated methylolmelamine or mixedly methoxylated/butoxylated methylolmelamine together with butoxylated methylolmelamine.

Examples of epoxy compound are diglycidyl ether of bisphenol A and oligomers thereof, diglycidyl ether of hydrogenated bisphenol A and oligomers thereof, diglycidyl orthophthalate, diglycidyl isophthalate, diglycidyl terephthalate, diglycidyl p-hydroxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether and polyalkylene glycol diglycidyl ethers, triglycidyl trimellitate, triglycidyl isocyanurate, 1,4-diglycidyloxybenzene, diglycidylpropylene urea, glycerol triglycidyl ether, trimethylolethane triglycidyl ether, trimethylolpropane triglycidyl ether, pentaerythritol tetraglycidyl ether, and triglycidyl ether of glycerol alkylene oxide adduct.

The isocyanate compound includes aromatic and aliphatic diisocyanates and polyisocyanates with three or more valencies. They may be either low- or high-molecular compounds. Examples are tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, or trimers of those isocyanate compounds, and compounds having terminal isocyanate group which are prepared by the reaction of excessive amount of those isocyanate compounds with low-molecular active hydrogen compounds such as ethylene glycol, propylene glycol, trimethylolpropane, glycerol, sorbitol, ethylenediamine, monoethanolamine, diethanolamine and triethanolamine or with high-molecular active hydrogen compounds such as polyester polyols, polyether polyols and polyamides.

The isocyanate compound may be a blocked one. Examples of an agent for blocking the isocyanate are phenols such as phenol, thiophenol, methylthiophenol, ethylthiophenol, cresol, xylenol, resorcinol, nitrophenol and chlorophenol; oximes such as acetoxime, methyl ethyl ketoxime and cyclohexanone oxime; alcohols such as methanol, ethanol, propanol and butanol; halogen-substituted alcohols such as ethylene chlorohydrin and 1,3-dichloro-2-propanol; tertiary alcohols such as tert-butanol and tert-pentanol; lactams such as epsilon-caprolactam, delta-valerolactam, gamma-butyrolactam and beta-propiolactam; aromatic amines and imides; active methylene compounds such as acetylacetone, acetoacetates and ethyl malonate; mercaptans; imines; ureas; diaryl compounds; and sodium bisulfite. Blocked isocyanates can be prepared by subjecting the above-mentioned isocyanate compounds and blocking agent therefor to a reaction of addition by a suitable method which has been known in the art.

Those cross-linking agents may be used together with known hardeners or accelerators which are selected depending upon the type.

Sufficient effect is resulted even when the paint composition per se of the present invention is applied on a metal sheet followed by baking but, if there is a demand of, for example, improvement of corrosion resistance, epoxy resin, polyester resin, urethane resin, etc. may be used as a primer coating agent too.

Baking temperature of the paint composition of the present invention may be freely selected depending upon size and thickness of the steel sheet, ability of the baking furnace, hardening property of the paint, etc. In the manufacture of the paint composition, mixers such as roll mill, ball mill and blender are used. Roller coating, roll coater, spray coating, electrostatic coating, etc. may be suitably selected in conducting a coating.

Depending upon the object and the use, additives including pigments such as titanium oxide, carbon black, organic color pigments and inorganic color pigments; dyes; body pigments such as aluminum flakes, silica, talc and barium sulfate; glass fiber; colloidal silica; wax; etc. may be added to the paint composition of the present invention.

EXAMPLES

The present invention will now be further illustrated by way of the following examples. In the examples, the term "part(s)" means that/those by weight. Incidentally, each of the measurements was conducted by the following methods.

1. Reduced Viscosity $\eta sp/c$ (dl/g).

Polyester resin (0.10 g) was dissolved in 25 ml of a mixed solvent of phenol and tetrachloroethane (6:4 by weight) and the measurement was conducted at 30° C.

2. Number-average Molecular Weight.

Measurement was conducted by means of gel permeation chromatograph (GPC) using an standard sample of polystyrene as a standard. Tetrahydrofuran was used as a solvent.

3. Glass Transition Point.

Measurement was conducted using a differential scanning calorimeter (DSC) at a temperature rising rate of 20° C. per minute. The sample (5 mg) was placed in a container made of aluminum and used after being crimped.

4. Acid Value.

Sample (0.2 g) was precisely weighed and dissolved in 20 ml of chloroform. Then measurement was conducted by titrating with 0.01N ethanolic solution of potassium hydroxide. Phenolphthalein was used as an indicator.

5. Specific Gravity.

A 500 ml measuring cylinder in which an aqueous solution (ca. 20%) of calcium chloride was placed was adjusted to 30±0.05° C., a sample (polyester resin) without oil and foams was placed therein and specific gravity of calcium chloride solution was adjusted so that the sample was located at the middle of the measuring cylinder. The specific gravity of the calcium chloride solution at that time was measured by a hydrometer and was defined as the specific gravity of the sample.

6. Gloss.

A 60°-reflectivity of coated surface of steel sheet was measured.

7. Hardness.

Measurement was conducted in accordance with JIS K-5400 using a high-quality pencil (as regulated by JIS S-6006) on a coated surface of steel sheet and the judgment was done by checking the state of scratches.

8. Stain Resistance.

8-1. Stain Resistance Against Felt-tip Pen.

Lines were drawn using a red felt-tip pen on the coated surface of steel sheet, the sheet was allowed to stand for two hours, the lines were wiped off with ethanol and the marks, if any, after wiping were checked and evaluated in a five-grade system in which 5 was for no mark noted while 1 was for all marks clearly remained.

8-2. Resistance Against Gaskets.

Gasket for doors of refrigerators was stuck on the coated surface of steel sheet by means of magnet, allowed to stand at 70° C. for 96 hours, detached from the surface, then the coated surface was wiped with old cloth and the marks, if any, after wiping were checked and evaluated in a five-grade system in which 5 was for no mark noted, 4 for slight marks noted, 3 for some marks noted and 1 for all marks clearly remained.

9. Processability.

The coated steel sheet was bent down to an extent of 180° and cracks at the bent area were observed under a small 10-power magnifier and evaluated. The evaluation "3T" means the case where three sheets having the same thickness as that of the bent sheet were sandwiched between the bent area while the evaluation of "0T" means the case where bending of 180° was conducted without sandwiching the sheet.

10. Drawing Processability.

Wax was applied on the coated surface of steel sheet and the sheet was made into a square can (60 mm side length and 45 mm depth) using a pressing machine. Gloss of the side of the can was compared and evaluated with that of the bottom of the can by means of naked eye.

5: almost no change in gloss; 4: slight decrease in gloss; 3: decrease in gloss; 1: significant decrease in gloss with partial peeling.

11. Impact Resistance.

Evaluation was conducted by treating the coated steel sheet with a Du Pont type impact resistance tester under the condition of 40 cm height and 500 g load.

5: no crack; 4: slight whitening due to cracks; 3: cracks generated; 1: significant cracks generated.

12. Blocking Resistance.

Two coated steel sheets in which a coated side of one sheet and a back side of another were faced were heated with a heat press at 60° C. and 5 $kg/cm^2$ for one hour, then restored to ambient temperature, torn off softly and the evaluation was conducted.

5: no mark noted; 4: marks noted slightly; 3: marks noted; 2: marks noted significantly; 1: tearing impossible.

13. Scuff Resistance.

Coated surface of steel sheet was strongly scratched with a nail and generation of scratch was evaluated by naked eye.

5: no scratch; 4: slight scratch noted; 3: scratch noted; 1: significant scratch noted.

Synthetic Example (A)

Dimethylterephthalic acid (388 parts), 388 parts of dimethylisophthalic acid, 714 parts of 2-methyl-1,3-propanediol, 104 parts of 1,6-hexanediol and 0.41 part of tetrabutyl titanate were placed in a reactor equipped with a stirrer, a condenser and a thermometer and a transesterification was conducted by raising the temperature from 160° C. to 230° C. during four hours. Then the system was gradually depressurized to 5 mmHg over 20 minutes. After that, polycondensation was carried out at not higher than 0.3 mmHg and at 260° C. for 40 minutes. The resulting copolymerized polyester (A) was subjected to an analysis by means of NMR etc. and found to comprise acid components consisting of terephthalic acid and isophthalic acid in 50:50 molar ratio and glycol components consisting of 2-methyl-1,3-propanediol and 1,6-hexanediol in 85:15 molar ratio. Its reduced viscosity was 0.45 dl/g, glass transition temperature was 40° C., acid value was 13 equivalents/$10^6$ g, specific gravity was 1.24, number-average molecular weight was 11,000 and hydroxyl value was 151 equivalents/$10^6$ g. The result is given in Table 1.

Polyester resins (B)–(N) having compositions shown in Tables 1–3 were synthesized according to a method of the above Synthetic Example. Polyester (O) was synthesized by a dehydrating condensation in a nitrogen stream under ordinary pressure. (G)–(O) are polyesters for comparison.

EXAMPLE 1

(Evaluations by Formulation With White Color)

To a solution of 100 solid parts of polyester resin (A) were added 125 parts of titanium oxide, 12.5 solid parts of methylated melamine (trade name: Sumimal M40S; manufactured by Sumitomo Chemical Co., Ltd.), 12.5 solid parts of butylated melamine (trade name: Super Beckamine J-820; manufactured by Dainippon Ink & Chemicals, Inc.), 2.5 parts of 10% solution of p-toluenesulfonic acid in benzyl alcohol and 0.5 part of Polyflow S (manufactured by Kyoeisha Chemical Co., Ltd.) and the mixture was dispersed for five hours by a glass beads type high-speed shaker to give a coating composition.

The coating composition was applied to a zinc plated iron shee (thickness: 0.5 mm; precoated with a primer paint of a polyester type) to make the coat thickness 18 μm and then baked at 230° C. for one minute. The resulting coat exhibited good processability and hardness and, in addition, showed excellent drawing processability and stain resistance. The test result is given in Table 4.

EXAMPLE 8

(Evaluation by a Deep Color Formulation)

To a solution of 100 solid parts of polyester resin (A) were added 10 parts of carbon black, 20 solid parts of M40S (mentioned already), 15 solid parts of J-820 (mentioned already), 10 parts of a 10% solution of p-toluenesulfonic acid in benzyl alcohol, 0.5 part of Polyflow-S (mentioned already) and 0.5 part of a dispersing agent and the mixture was dispersed for five hours in a glass beads type high-speed shaker to give a coating composition.

This coating composition was applied on a zinc plated iron sheet (thickness: 0.5 mm; precoated with a primer paint of a polyester type) to a coat thickness of 18 μm and baked a 230° C. for one minute. The resulting coat exhibited excellent gloss and showed good processability, hardness and scuff resistance. It also had very good blocking resistance and impact resistance. When it was exposed to outdoor circumstances for one year, it still maintained gloss with a retaining rate of not less than 90%. The test result is given in Table 4.

Coating compositions of Examples 2–13 and Comparative Examples 1–18 having compositions as shown in Tables 4–10 were similarly prepared, applied and baked. Test results of the resulting coated steel sheet are given in Tables 4–10 where the formulation ratio of the compositions are given on a solid basis.

TABLE 1

| | Polyester Resins | | | | | |
|---|---|---|---|---|---|---|
| | A | B | C | D | E | F |
| | Composition (molar %) | | | | | |
| Acid Components | | | | | | |
| Terephthalic acid | 50 | 30 | 29 | 19 | 30 | 30.0 |
| Isophthalic acid | 50 | 68 | 68 | 79 | 69 | 69.3 |
| Trimellitic acid | | 1 | 1 | 1 | | |
| Trimellitic acid (added later) | | 1 | 2 | 1 | 1 | 0.7 |
| Diol Components | | | | | | |
| 2-Methyl-1,3-propanediol | 85 | 85 | 100 | 64 | | 31 |
| 1,3-Propanediol | | | | | 65 | |
| 1,5-Pentanediol | | 15 | | | | 37 |
| 1,6-Hexanediol | 15 | | | | | |
| 3-Methyl-1,5-pentanediol | | | | | 35 | |
| 1,4-Cyclohexane-dimethanol | | | | 36 | | |
| 1,4-Butanediol | | | | | | 32 |
| Reduced Viscosity (dl/g) | 0.45 | 0.50 | 0.60 | 0.55 | 0.58 | 0.35 |
| Glass Transition Temp (° C.) | 40 | 45 | 47 | 55 | 25 | 21 |
| Specific Gravity | 1.24 | 1.26 | 1.26 | 1.24 | 1.26 | 1.25 |
| Acid Value (Eq/$10^6$ g) | 13 | 91 | 190 | 88 | 93 | 62 |
| Number-Average Mol. Wt. | 11000 | 12800 | 16500 | 18500 | 19000 | 8000 |
| Hydroxyl Value (Eq/$10^6$ g) | 151 | 161 | 76 | 114 | 60 | 205 |

TABLE 2

| | Polyester Resins for Comparison | | | | |
|---|---|---|---|---|---|
| | G | H | I | J | K |
| | Composition (molar %) | | | | |
| Acid Components | | | | | |
| Terephthalic acid | 50 | 40 | 50 | 41 | 29 |
| Isophthalic acid | 50 | 60 | 49 | 59 | 69 |
| Trimellitic acid | | | | | 1 |
| Trimellitic acid (added later) | | | 1 | | 1 |
| Diol Components | | | | | |
| 2-Methyl-1,3-propanediol | | | | 10 | 85 |
| 1,5-pentanediol | | 15 | | | |
| 1,6-Hexanediol | 50 | | 16 | 90 | |
| 3-Methyl-1,5-pentanediol | | | | | 15 |
| Ethylene Glycol | 50 | 85 | | | |
| Neopentyl Glycol | | | 84 | | |
| Reduced Viscosity (dl/g) | 0.42 | 0.45 | 0.48 | 0.62 | 0.15 |
| Glass Transition Temp (° C.) | 15 | 50 | 56 | 9 | 32 |
| Specific Gravity | 1.25 | 1.28 | 1.21 | 1.20 | 1.26 |
| Acid Value (Eq/$10^6$ g) | 10 | 13 | 90 | 88 | 95 |
| Number-Average Mol. Wt. | 11000 | 11000 | 12000 | 16500 | 2000 |
| Hydroxyl Value (Eq/$10^6$ g) | 177 | 175 * | 122 | 77 | 1003 |

Notes
*: Stability of varnish was poor.

TABLE 3

| | Polyester Resins for Comparison | | | |
|---|---|---|---|---|
| | L | M | N | O |
| | Composition (molar %) | | | |
| Acid Components | | | | |
| Terephthalic acid | | | 47 | |
| Isophthalic acid | 50 | 71 | 42 | 80 |
| Orthophthalic acid | 49 | 21 | | |
| Sebacic acid | | | 11 | |
| Adipic acid | | | | 20 |
| Trimellitic acid | 1 | | | |
| Trimellitic acid (added later) | | | | |
| Diol Components | | | | |
| 2-Methyl-1,3-propanediol | 85 | | | 84 |
| 1,5-Pentanediol | 15 | | | |
| 1,6-Hexanediol | | 75 | | |
| 3-Methyl-1,5-pentanediol | | | | |
| Ethylene Glycol | | | 55 | |
| Neopentyl Glycol | | 25 | 45 | |
| Pentaerythritol | | | | 16 |
| Reduced Viscosity (dl/g) | 0.45 | 0.35 | 0.50 | 0.11 |
| Glass Transition Temp (° C.) | 41 | 10 | 45 | −10 |
| Specific Gravity | 1.26 | 1.20 | 1.25 | 1.22 |
| Acid Value (Eq/$10^6$ g) | 89 | 12 | 10 | 232 |
| Number-Average Mol. Wt. | 11000 | 8100 | 12800 | 1500 |
| Hydroxyl Value (Eq/$10^6$ g) | 187 | 238 | 151 | 1875 ** |

Notes
**: Conducted under ordinary pressure. Thus, dehydration and polymerization were conducted under ordinary pressure until the acid value became 232 equivalents/$10^6$ g (13 mg KOH/g).

TABLE 4

| | Examples | | | | |
|---|---|---|---|---|---|
| | 1 | 2 | 3 | 4 | 5 |
| Composition (Solid parts): | | | | | |
| Polyester resin | A 100 | B 100 | B 100 | C 100 | D 100 |
| Aminoformaldehyde resin (1) | 12.5 | 12.5 | | 12.5 | 12.5 |
| Aminoformaldehyde resin (2) | 12.5 | 12.5 | | 12.5 | 12.5 |
| Blocked isocyanate (3) | | | 25 | | |
| p-Toluenesulfonic acid | 0.25 | 0.25 | | 0.25 | 0.25 |
| Dibutylene dilaurate | | | 0.50 | | |
| Titanium oxide | 125 | 125 | 125 | 125 | 125 |
| Polyflow-S | 0.5 | 0.5 | 0.5 | 0.5 | 0.5 |
| Properties of Coat: | | | | | |
| Gloss (%) | 91 | 91 | 90 | 92 | 90 |
| Processability (T) | 2 | 2 | 1 | 2 | 2 |
| Hardness | H | H | F | H | H-2H |
| Drawing Processability | 5 | 5 | 5 | 5 | 5 |
| Gasket Resistance | 5 | 5 | 5 | 5 | 5 |
| Felt-Tip Marker Resistance | 4 | 5 | 3 | 5 | 5 |

(1) Sumimal M40S (methoxymethylol-modified melamine manufacture by Sumitomo Chemical)
(2) Super Beckamine J-820 (butoxymethylol-modified melamine manufactured by Dainippon Ink & Chemicals)
(3) IPDI B1530 (manufactured by Daicel Huls)

TABLE 5

| | Examples | |
|---|---|---|
| | 6 | 7 |
| Composition (Solid parts): | | |
| Polyester resin | E 100 | F 100 |
| Aminoformaldehyde resin (1) | 12.5 | 12.5 |
| Aminoformaldehyde resin (2) | 12.5 | 12.5 |
| p-Toluenesulfonic acid | 0.25 | 0.25 |
| Titanium oxide | 125 | 125 |
| Polyflow-S | 0.5 | 0.5 |
| Properties of Coat: | | |
| Gloss (%) | 90 | 92 |
| Processability (T) | 0 | 0 |
| Hardness | H | H |
| Drawing Processability | 5 | 5 |
| Gasket Resistance | 5 | 5 |
| Felt-Tip Marker Resistance | 5 | 5 |

(1) Sumimal M40S (methoxymethylol-modified melamine manufacture by Sumitomo Chemical)
(2) Super Beckamine J-820 (butoxymethylol-modified melamine manufactured by Dainippon Ink & Chemicals)

TABLE 6

| | Examples | | | | | |
|---|---|---|---|---|---|---|
| | 8 | 9 | 10 | 11 | 12 | 13 |
| Composition (Solid parts): | | | | | | |
| Polyester resin | A 100 | B 100 | C 100 | D 100 | E 100 | F 100 |
| Aminoformaldehyde resin (1) | 20 | 20 | 20 | 20 | 20 | 20 |
| Aminoformaldehyde resin (2) | 15 | 15 | 15 | 15 | 15 | 15 |
| p-Toluenesulfonic acid | 1 | 1 | 1 | 1 | 1 | 1 |
| Carbon black | 10 | 10 | 10 | 10 | 10 | 10 |
| Polyflow-S | 0.5 | 0.5 | 0.5 | 0.5 | 0.5 | 0.5 |
| Dispersing agent | 0.5 | 0.5 | 0.5 | 0.5 | 0.5 | 0.5 |

TABLE 6-continued

| | Examples | | | | | |
|---|---|---|---|---|---|---|
| | 8 | 9 | 10 | 11 | 12 | 13 |
| Properties of Coat: | | | | | | |
| Gloss (%) | 95 | 94 | 95 | 96 | 92 | 93 |
| Processability (T) | 1 | 1 | 1 | 1 | 0 | 0 |
| Hardness | F | H | H | H | F | F |
| Scuff Resistance | 4 | 5 | 5 | 5 | 5 | 5 |
| Impact Resistance | 5 | 5 | 5 | 5 | 5 | 5 |
| Blocking Resistance | 5 | 5 | 5 | 5 | 4 | 4 |

(1) Sumimal M40S (methoxymethylol-modified melamine manufacture by Sumitomo Chemical)
(2) Super Beckamine J-820 (butoxymethylol-modified melamine manufactured by Dainippon Ink & Chemicals)

TABLE 7

| | Comparative Examples | | | | |
|---|---|---|---|---|---|
| | 1 | 2 | 3 | 4 | 5 |
| Composition (Solid parts): | | | | | |
| Polyester resin | G 100 | H 100 | I 100 | J 100 | K 100 |
| Aminoformaldehyde resin (1) | 12.5 | 12.5 | 12.5 | 12.5 | 12.5 |
| Aminoformaldehyde resin (2) | 12.5 | 12.5 | 12.5 | 12.5 | 12.5 |
| p-Toluenesulfonic acid | 0.25 | 0.25 | 0.25 | 0.25 | 0.25 |
| Titanium oxide | 125 | 125 | 125 | 125 | 125 |
| Polyflow-S | 0.5 | 0.5 | 0.5 | 0.5 | 0.5 |
| Properties of Coat: | | | | | |
| Gloss (%) | 88 | 80 | 93 | 90 | 93 |
| Processability (T) | 4 | 3(*) | 5 | 0 | 7 |
| Hardness | H | H | HB | B | F |
| Drawing Processability | 2–3 | 2–3 | 2 | 2 | 2 |
| Gasket Resistance | 5 | 5 | 2 | 2 | 2 |
| Felt-Tip Marker Resistance | 5 | 5 | 2 | 2 | 4 |

(1) Sumimal M40S (methoxymethylol-modified melamine manufacture by Sumitomo Chemical)
(2) Super Beckamine J-820 (butoxymethylol-modified melamine manufactured by Dainippon Ink & Chemicals)
(*): Deterioration in processability with lapse of time was noted. The processability immediately after coating was 3T but, when the coated sheet was allowed to stand at room temperature for three months, deterioration proceeded down to 6T.

TABLE 8

| | Comparative Examples | | | |
|---|---|---|---|---|
| | 6 | 7 | 8 | 9 |
| Composition (Solid parts): | | | | |
| Polyester resin | L 100 | M 100 | N 100 | O 100 |
| Aminoformaldehyde resin (1) | 12.5 | 12.5 | 12.5 | 12.5 |
| Aminoformaldehyde resin (2) | 12.5 | 12.5 | 12.5 | 12.5 |
| p-Toluenesulfonic acid | 0.25 | 0.25 | 0.25 | 0.25 |
| Titanium oxide | 125 | 125 | 125 | 125 |
| Polyflow-S | 0.5 | 0.5 | 0.5 | 0.5 |
| Properties of Coat: | | | | |
| Gloss (%) | 92 | 90 | 90 | 89 |
| Processability (T) | 5 | 2 | 4 | 7 |
| Hardness | F | HB | F | HB |
| Drawing Processability | 3 | 2 | 2 | 1 |

TABLE 8-continued

| | Comparative Examples | | | |
|---|---|---|---|---|
| | 6 | 7 | 8 | 9 |
| Gasket Resistance | 5 | 2 | 3 | 3 |
| Felt-Tip Marker Resistance | 5 | 2 | 3 | 2 |

(1) Sumimal M40S (methoxymethylol-modified melamine manufacture by Sumitomo Chemical)
(2) Super Beckamine J-820 (butoxymethylol-modified melamine manufactured by Dainippon Ink & Chemicals)

TABLE 9

| | | Comparative Examples | | | |
|---|---|---|---|---|---|
| | 10 | 11 | 12 | 13 | 14 |
| Composition (Solid parts): | | | | | |
| Polyester resin | G 100 | H 100 | I 100 | J 100 | K 100 |
| Aminoformaldehyde resin (1) | 20 | 20 | 20 | 20 | 20 |
| Aminoformaldehyde resin (2) | 15 | 15 | 15 | 15 | 15 |
| p-Toluenesulfonic acid | 1 | 1 | 1 | 1 | 1 |
| Carbon black | 10 | 10 | 10 | 10 | 10 |
| Polyflow-S | 0.5 | 0.5 | 0.5 | 0.5 | 0.5 |
| Dispersing agent | 0.5 | 0.5 | 0.5 | 0.5 | 0.5 |
| Properties of Coat: | | | | | |
| Gloss (%) | 94 | 83 | 95 | 93 | 93 |
| Processability (T) | 3 | 3(*) | 4 | 1 | 5 |
| Hardness | HB | H | B | B | F |
| Scuff Resistance | 2 | 5 | 2 | 2 | 2 |
| Impact Resistance | 3 | 3 | 2 | 5 | 1 |
| Blocking Resistance | 5 | 5 | 2 | 2 | 3 |

(1) Sumimal M40S (methoxymethylol-modified melamine manufacture by Sumitomo Chemical)
(2) Super Beckamine J-820 (butoxymethylol-modified melamine manufactured by Dainippon Ink & Chemicals)
(*) Deterioration in processability with lapse of time was noted. The processability immediately after manufacture was 3T but, when the coated sheet was allowed to stand at room temperature for three months, deterioration proceeded down to 6T.

TABLE 10

| | Comparative Examples | | | |
|---|---|---|---|---|
| | 15 | 16 | 17 | 18 |
| Composition (Solid parts): | | | | |
| Polyester resin | L 100 | M 100 | N 100 | O 100 |
| Aminoformaldehyde resin (1) | 20 | 20 | 20 | 20 |
| Aminoformaldehyde resin (2) | 15 | 15 | 15 | 15 |
| p-Toluenesulfonic acid | 1 | 1 | 1 | 1 |
| Carbon black | 10 | 10 | 10 | 10 |
| Polyflow-S | 0.5 | 0.5 | 0.5 | 0.5 |
| Dispersing agent | 0.5 | 0.5 | 0.5 | 0.5 |
| Properties of Coat: | | | | |
| Gloss (%) | 95 | 94 | 92 | 92 |
| Processability (T) | 4 | 1 | 4 | 6 |
| Hardness | HB | B | HB | HB |
| Scuff Resistance | 4 | 2 | 2 | 3 |
| Impact Resistance | 3 | 3 | 2 | 2 |
| Blocking Resistance | 5 | 2 | 4 | 3 |

(1) Sumimal M40S (methoxymethylol-modified melamine manufacture by Sumitomo Chemical)
(2) Super Beckamine J-820 (butoxymethylol-modified melamine manufactured by Dainippon Ink & Chemicals)

[MERIT OF THE INVENTION]

In the coating composition of the present invention, both hardness and processability/stain resistance can be maintained in a high level. Moreover, the surprising fact is that the composition exhibits an excellent drawing processability which has not been available in prior art and, even in clear or low pigment concentration, appearance of the coat is excellent and all of good processability, hardness, scuff resistance, impact resistance, stain resistance and blocking resistance are available. Thus, the composition is able to meet with a demand for high quality in the field of home electric appliances including outdoor use and of cans for food and beverages. In addition, the polyester resin used in the present invention can be used not only as a paint composition but also, with or without known hardeners, as an adhesive for various materials such as plastic film (e.g. polyethylene terephthalate film) and metal sheet (e.g. iron and tinplate) and as a binder for various pigments.

What is claimed is:

1. A coating resin composition characterized in that, in said composition, polyester resin (A) of a glass transition point of 15–80° C., a reduced viscosity of not less than 0.2 dl/g, an acid value of 50–350 equivalents/$10^6$ g and a specific gravity of 1.21–1.30 having acid components which comprise 10–70 molar % of terephthalic acid where the total amount of terephthalic acid and other aromatic dicarboxylic acids is 80–100 molar % and the amount of other dicarboxylic acids is 0–20 molar % and glycol components which comprise 30–100 molar % of 2-methyl-1,3-propanediol and 0–70 molar % of alkylene glycol having five to ten carbon atoms and/or alicyclic glycols where the total amount of said glycols is not less than 50 molar % is compounded with a hardener (B) which is able to react with said polyester resin (A) in a ratio of (A)/(B)=from 95/5 to 60/40 by weight.

2. A coating resin composition according to claim 1 in which the amount of terephthalic acid in the acid components of the polyester resin (A) is 20–60 molar % and the total amount of terephthalic acid and other aromatic dicarboxylic acids is 90–100 molar %.

3. A coating resin composition according to claim 1 in which the amount of alkylene glycol with 5–10 carbon atoms and/or alicyclic glycol in the glycol components of the polyester resin (A) is 10–50 molar %.

4. A coating resin composition according to claim 3 in which the alkylene glycol with 5–10 carbon atoms is 1,5-pentanediol and/or 1,6-hexanediol.

5. A coating resin composition according to claim 3 in which the alicyclic glycol is 1,4-cyclohexanedimethanol.

6. A coating resin composition according to claim 1 in which the glass transition point of the polyester resin (A) is 15–60° C.

7. A coating resin composition according to claim 1 in which the reduced viscosity of the polyester resin (A) is not less than 0.3 dl/g.

8. A coating resin composition according to claim 1 in which the specific gravity of the polyester resin (A) is 1.22–1.28.

9. A coating resin composition according to claim 1 in which the polyester resin (A) is after-added with an acid anhydride.

10. A coating resin composition according to claim 9 in which the acid value and the hydroxyl value of the polyester resin (A) are 50–250 and 30–250 equivalents/$10^6$ g, respectively.

11. A coating resin composition comprising polyester resin (A) of a glass transition point of 15–80° C., a reduced viscosity of not less than 0.2 dl/g, an acid value of 50–350 equivalents/$10^6$ g and a specific gravity of 1.21–1.30 having acid components which comprise 10–70 molar % of terephthalic acid wherein the total amount of terephthalic acid and other aromatic dicarboxylic acids is 80–100 molar % and the amount of other dicarboxylic acids is 0–20 molar % and glycol components which comprise 30–100 molar % of 2-methyl-1,3-propandiol and/or 1,3-propanediol and 0–70 molar % of alkylene glycol having five to ten carbon atoms and/or alicyclic glycols where the total amount of said glycols is not less than 50 molar % compounded with a hardener (B) which is able to react with said polyester resin (A) in a ratio of (A)/(B)=95/5 to 60/40 by weight.

12. A coating resin composition according to claim 11 wherein the total amount of 2-methyl-1,3-propanediol and glycols with 5–10 carbon atoms having alkyl groups in side chain in the glycol components of the polyester resin(A) are from about 50% to about 100% by weight.

* * * * *

UNITED STATES PATENT AND TRADEMARK OFFICE

CERTIFICATE OF CORRECTION

PATENT NO. : 6,077,917
DATED : June 20, 2000
INVENTOR(S) : Hiroshi Tachika, et al.

It is certified that error appears in the above-identified patent and that said Letters Patent is hereby corrected as shown below:

| Column | Line | |
|---|---|---|
| 1 | 32 | Change "any" to --none--; delete "does not". |
| 1 | 33 | Change "property" to --properties--. |
| 1 | 66 | Change "reuslting" to --resulting--. |
| 3 | 21 | Change "acid" to --acids--. |
| 3 | 60 | Change "vanish" to --varnish--. |
| 4 | 1 | Change "vanish" to --varnish--. |
| 4 | 25 | Change "glycrol" to --glycol--. |
| 5 | 43-44 | Change "mixedly" to --partially--. |
| 5 | 47 | Change "mixedly" to --partially--. |
| 6 | 8 | Change "group" to --groups--. |

UNITED STATES PATENT AND TRADEMARK OFFICE

CERTIFICATE OF CORRECTION

PATENT NO. : 6,077,917
DATED : June 20, 2000
INVENTOR(S) : Hiroshi Tachika, et al.

It is certified that error appears in the above-identified patent and that said Letters Patent is hereby corrected as shown below:

| Column | Line | |
|---|---|---|
| 8 | 67 | Change “shee” to --sheet--. |
| 9 | 21 | Change “a” to --at--. |
| 15 | 7 | Change “propandiol” to --propanediol--. |
| 15 | 10 | After “%” insert --is--. |

Signed and Sealed this

Eighth Day of May, 2001

Attest:

Nicholas P. Godici

NICHOLAS P. GODICI

*Attesting Officer*

*Acting Director of the United States Patent and Trademark Office*